Figure 1:
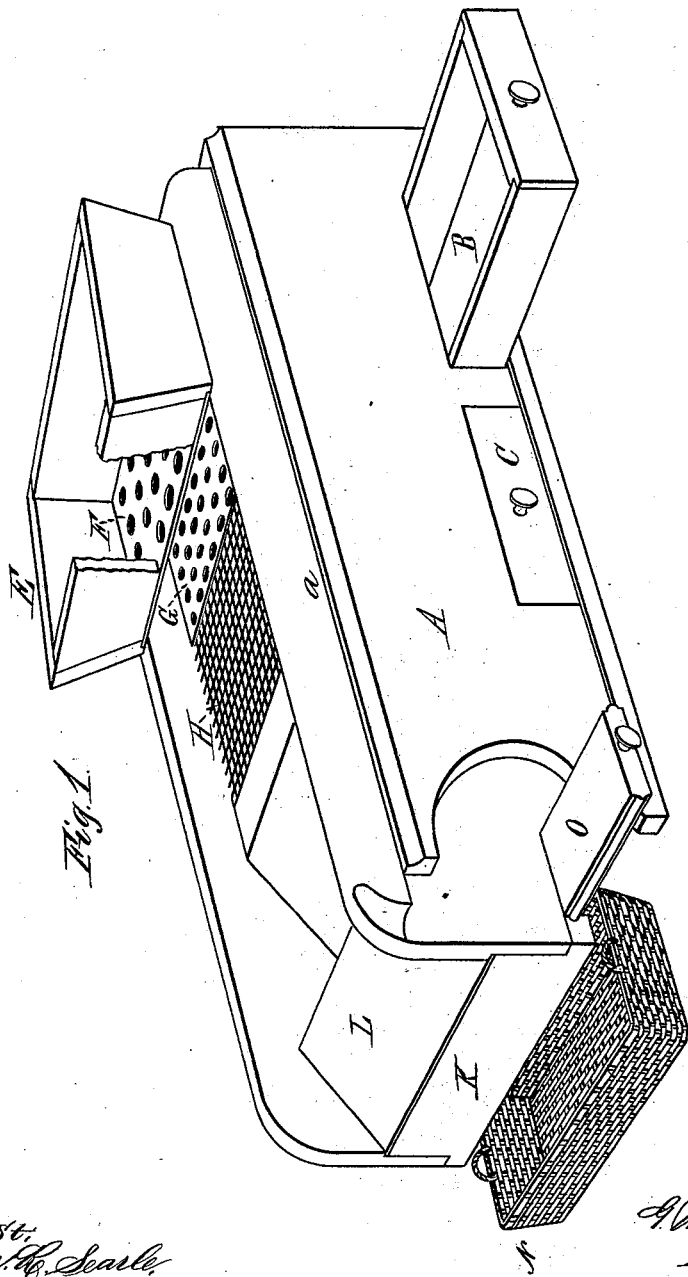

2 Sheets—Sheet 1.

G. W. EARHART.
Grain-Separators.

No. 208,896. Patented Oct. 15, 1878.

Attest:
Chas. H. Searle,
W. E. Chaffee

G. W. Earhart,
Inventor:
By Worth Osgood
Attorney.

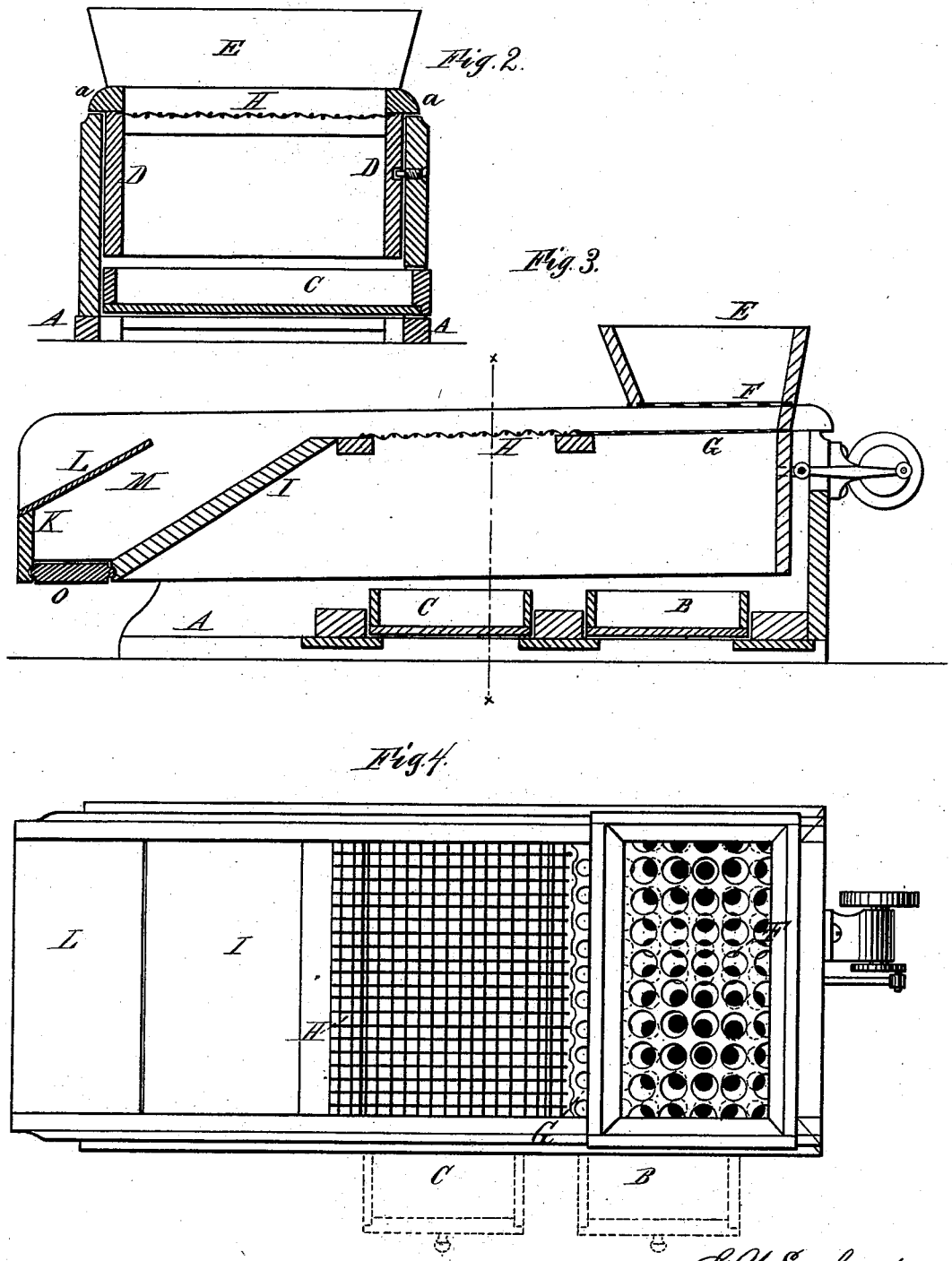

UNITED STATES PATENT OFFICE.

GEORGE W. EARHART, OF COLUMBUS, OHIO.

IMPROVEMENT IN GRAIN-SEPARATORS.

Specification forming part of Letters Patent No. 208,896, dated October 15, 1878; application filed November 6, 1877.

*To all whom it may concern:*

Be it known that I, GEORGE W. EARHART, of Columbus, county of Franklin, and State of Ohio, have invented certain new and useful Improvements in Machines for Cleaning Coffee, &c., of which the following is a full, clear, and exact description, reference being had to the accompanying drawings, and to the letters of reference marked thereon.

Figure 1 is a perspective view of my improved machine, illustrating the arrangement and operation of the several essential elements. Fig. 2 is a cross-section upon line $x$ $x$ of Fig. 3, and Fig. 3 is an axial section and elevation. Fig. 4 is a plan view, showing the drawers or slides in dotted lines, and as if partially withdrawn.

Like letters in all the figures indicate corresponding parts.

The object of my invention is to produce a machine for cleaning coffee, &c., which shall be simple in construction, effective in its operation, and capable of being run with the expenditure of very little power; and to accomplish all of this the invention consists in certain novel assemblages or combinations of parts, as will be hereinafter first fully described, and then pointed out in the claims.

A is the bed of the machine, made firm and durable, and containing the drawers or slides B C, suitably located beneath the sieves, and intended to catch and hold the material which passes through said sieves. The bed A is extended upwardly on both sides and at one end to form the ways or tracks upon which the movable parts slide back and forth. The several sieves employed, as well as the hopper, are mounted in or on the traveling frame D, which is composed of two side pieces properly braced, and made to fit in between the upright plates A A. Upon the tops of the sides of the frame D is an overhanging or projecting ledge, $a$, which supports the movable parts of the machine upon the plates A A. Motion is communicated through the medium of a crank and pitman, as shown in Figs. 3 and 4, or by any desirable mechanical means.

E is the hopper, having a foraminated bottom, F, elevated above the sieve G, and H is a third perforated plate.

At the end of the movable sieve and hopper carrier is an inclined plate, I, which, together with the pieces K and L, form a pocket, M, at the end of the machine. The machine being placed in motion, the coffee to be cleaned (or other material, whatever it may be) is turned into the hopper E, where the shells, sticks, and unhulled kernels are retained. The coffee, with the dust and fine-grained impurities, pass through sieve F and down upon G, which latter permits the passage of the finer material only. This settles down into slide or drawer B, and may be removed at pleasure. The continuous reciprocating motion of the machine carries the good coffee, the broken grains, and stones of about the same size along over sieve H, which is so graduated as to allow all matter smaller than whole grains of coffee to pass through. These broken grains are valuable and are collected in drawer at C. The stones and coffee together pass on over sieve H, and gradually fill the pocket M. The jarring motion of the machine causes the stones to settle at the bottom of the pocket, and at the same time forces the coffee to the top. The pocket M being full and the machine in motion, an eddy is formed at the upper end of the inclined plate I, in which the stones are carried down plate I and into the bottom of the pocket M, while the coffee is forced down the surface-current over the plate L, where it is caught in any suitable receptacle, as N.

The number of sieves may be varied at pleasure, so that the general arrangement is observed; and instead of one pocket at the end, any desired number may be provided. When these pockets become full of stones they are either scooped out or the pocket is emptied by withdrawing the bottom slide, (shown at O.)

The principles of the invention are applicable to the cleaning of other materials, wherein the impurities are of greater or less specific gravity, or of greater or less size, than the material to be cleaned.

The pocket M may, under certain circumstances, become the receptacle for the purified grains or material, and the lighter refuse be made to pass on over the end of the machine.

When constructed substantially in accordance with the foregoing description, the cleaner is found to operate smoothly and with great success, to be economical of power, and otherwise to fulfill all the objects of the invention, as previously stated.

Having thus fully described my invention, what I claim as new, and desire to secure by Letters Patent, is—

1. In a machine of the character herein specified, the movable sieve-carrier mounted upon the base and adapted to be reciprocated in the manner explained, said carrier being provided at one end with a depressed pocket, and at the other with an attached hopper having a foraminated bottom, the several parts being combined and arranged substantially as shown and described.

2. The combination, with stationary base A, of the hopper and sieve carrier supported upon said base by means of the projecting ledges a a, and adapted to be reciprocated, substantially as shown and described.

3. In combination with the stationary base A, the frame D, carrying the sieves H G and hopper E, which hopper is provided with a foraminated bottom, and the pocket M, having the inclined top plate, L, substantially as and for the purposes set forth.

In testimony that I claim the foregoing I have hereunto set my hand in the presence of two witnesses.

GEO. W. EARHART.

Witnesses:
E. C. BRIGGS,
C. L. SHRYOCK.